United States Patent

Iwawaki et al.

[15] 3,701,860

[45] Oct. 31, 1972

[54] MAGNETIC RECORDING AND REPRODUCING APPARATUS WITH TIME CONTROL IN CARTRIDGE

[72] Inventors: Yasutaka Iwawaki; Minoru Yoshikawa, both of Tokyo; Yukio Usui, Yokohama, all of Japan

[73] Assignee: Canon Kabushiki Kaisha, Tokyo, Japan

[22] Filed: Oct. 20, 1970

[21] Appl. No.: 82,384

[30] Foreign Application Priority Data

Oct. 28, 1969 Japan ......................44/86256
April 1, 1970 Japan ......................45/28127

[52] U.S. Cl.....179/100.2 F, 179/100.2 E, 179/100.2 MD 179/100.1 VC

[51] Int. Cl...........................G11b 5/28, G11b 23/06

[58] Field of Search...179/100.2 S, 100.2 E, 100.2 Z, 179/100.2 HI, 100.2 K, 6 R, 100.1 VC; 35/35 C

[56] References Cited

UNITED STATES PATENTS 3,165,595 1/1965 Noshiro............179/100.1 VC
3,601,558 8/1971 Sugaya................179/100.2 K
3,376,390 4/1968 Hashimoto................179/6 R

FOREIGN PATENTS OR APPLICATIONS 730,664 1955 Great Britain .............35/35 C

*Primary Examiner*—Terrell W. Fears
*Assistant Examiner*—Jay P. Lucas
*Attorney*—Ward, McElhannon, Brooks & Fitzpatrick

[57] ABSTRACT

The magnetic recording and reproducing apparatus is provided with timing means which starts the time counting from the leading end of the signals to be recorded on an endless magnetic recording medium and is reset after one rotation of the endless recording medium, so that recording means may be retained in the recording mode during one rotation of the endless recording medium whereby the desired signals or informations may be recorded along the whole length of the endless recording medium during the interval from the setting to the resetting of the timing means. Part of the timing means is included in a tape cartridge.

13 Claims, 10 Drawing Figures

MAGNETIC RECORDING AND REPRODUCING APPARATUS WITH TIME CONTROL IN CARTRIDGE

BACKGROUND OF THE INVENTION

The present invention relates to a magnetic recording and reproducing apparatus and more specifically to a magnetic recording apparatus for recording and reproducing only the desired information on and from the endless magnetic recording medium.

In case that the reproduction is made from the conventional magnetic recording medium such as an endless magnetic tape, magnetic disk, magnetic drum and so on, a portion of the information previously recorded in a non-recording portion is reproduced when the information is recorded at random portions and unless the information is recorded along the whole length of the endless magnetic recording medium. The previously recorded information thus reproduced has an effect similar to the noise, thus causing the discomfort in listening. On the other hand, when the information is recorded upon the endless magnetic recording medium in excess of its length, the information is recorded upon the previously recorded portion of the endless magnetic recording medium beyond the starting point so that the previously recorded information is partially erased.

There has been proposed a method for overcoming the problems described above in which an end mark such as a conductive foil, a reflecting foil, etc. is pasted upon for example an endless magnetic tape so that the transportation thereof may be automatically stopped in response to the detection of this end mark. However, according to this method, the end mark must be precisely located at a predetermined position prior to the use of the endless magnetic tape. Otherwise, the desired complete recording or reproduction cannot be accomplished at all. In addition, pasting an end mark upon the magnetic tape is too troublesome to be employed in practice.

There has been also proposed a magnetic recording apparatus in which desired informations are recorded upon a first magnetic recording medium such as a length of a magnetic recording tape which is available for a relatively long recording; when the information recorded upon the first magnetic recording medium is reproduced, the desired information if reprinted upon a second magnetic recording medium such as an endless magnetic tape; and the reprinted information is reproduced from the second magnetic recording medium while the first recording medium is stopped. The magnetic recording apparatus of the type described above may be very advantageously employed as a dictating machine or a tape recorder for learning a foreign language. However, when a length of the teaching materials recorded upon the first magnetic recording medium is shorter than the length of the endless tape, a shorter portion of the teaching materials previously recorded still remains on the endless tape so that this portion will be reproduced when the endless tape is reproduced. This causes much irritation in listening to a student. Especially when the teaching materials recorded upon the first magnetic recording medium are divided into sections or portions having substantially the same length, there may be provided a pause or non-recording portion between the adjacent teaching materials reprinted upon the second magnetic recording medium whose length is twice the length of the teaching materials. Therefore, the imitation of these teaching materials by the student may be recorded on another track of the endless magnetic recording tape between the adjacent teaching materials. Thus, the repetitive learning by cycling the recording of the teaching materials and the recording of the imitation of the teaching materials by the student may be carried on. However, there is a case in which the previously recorded teaching materials still remain upon the pause between the adjacent teaching materials newly recorded. Thus, the student is also irritated by the reproduction of these undesired teaching materials.

When the imitated speech by the student is recorded on the track of the endless magnetic tape upon which is not recorded the teaching materials in excess of the length of the endless magnetic recording medium, the leading portion of his imitated speed recorded will be erased. On the other hand, the length of the imitated speech is less than that of the endless magnetic recording medium, the previously recorded imitated speech or noise remains un-erased in the not-recorded portion and is reproduced, thus also causing the irritation to the student.

In case of the magnetic tape recorders of the type described above as well as in case of the tape recorders employing the endless magnetic recording medium, it is extremely difficult to record only the desired information upon the recording medium while erasing all the undesired information or noise.

SUMMARY OF THE INVENTION

It is therefore the primary object of the present invention to provide an improved magnetic recording and reproducing apparatus which can eliminate the defects described above.

It is another object of the present invention to provide an improved magnetic recording and reproducing apparatus capable of recording the desired information or teaching materials upon a magnetic recording medium without applying a special end mark or end mark signal upon the recording medium.

It is a further object of the present invention to provide an improved magnetic recording and reproducing apparatus in which the time counting means is initiated to operate in response to the starting end of the signals to be recorded upon an endless magnetic recording medium and the time counting means is reset after the endless magnetic recording medium makes one rotation so that the recording of the signals may be automatically stopped.

It is a further object of the present invention to provide an improved magnetic recording and reproducing apparatus of the type in which a cartridge containing an endless magnetic recording medium is provided with a time setting member representing or setting a time required for the recording medium to make one rotation so that recording means may be retained in the recording mode during one rotation of the endless recording medium whereby the desired information or signals may be recorded from its leading end upon the endless magnetic recording medium during the time it makes one rotation.

It is a further object of the present invention to provide an improved magnetic recording and reproducing apparatus of the type in which the information recorded upon a first magnetic tape having a relatively long recording time is reprinted upon an endless magnetic recording medium only along the length thereof from the leading end of the signals to be recorded.

It is a further object of the present invention to provide an improved magnetic recording and reproducing apparatus of the type in which an erase head disposed in opposed relation with an endless magnetic recording medium is controlled by timing means which starts the time counting from the leading end of the signals to be recorded and is reset after the endless recording medium makes one rotation so that the erase head is actuated during the time the endless magnetic recording medium makes one rotation from the leading end of the signals to be recorded thereupon, thereby to erase undesired noise or information on the recording medium.

The present invention will become more apparent from the following description of the preferred embodiment taken in conjunction with the accompanying drawings.

BRIEF DESCRIPTION OF THE DRAWING

Referring to FIGS. 1 and 2, the principle of the present invention will be described. Reference numeral 1 designates an endless tape which is transported at a speed V in the direction indicated by the arrow by a suitable conventional tape transporting mechanism including a capstan, a pinch roller,etc. An erase head 2 and a record-reproduce head 3 are disposed in contact with the endless tape 1. A distance $L_1$ is the distance over which the erase head 2 has no erasing effect and the distance $L_2$ is a spacing between the air gaps of the erase and record-reproduce heads 2 and 3. A reproduce amplifier 4 comprising a preamplifier and a power amplifier amplifies the signals from the record-reproduce head 3 so as to drive a loudspeaker 5. The signals from a microphone 6 are amplified and equalized by a record amplifier 7. A circuit 8 amplifies and reshapes the signals from the microphone 6 and triggers a mono-stable multi vibrator 9. When the monostable multivibrator is restored to its stable state a predetermined time later after it is triggered by the circuit 8, a trigger circuit 10 resets a bistable multivibrator 11. A recording-start signal is obtained from a signal source 12 upon depression of a push button 13 and is reshaped by a trigger circuit 14 for setting the bistable multivibrator 11.

A record-reproduce mode selector 15 includes an amplifier for energizing a relay for holding the record mode and a selection switches 16 and 16'. Tape-erasing current is supplied from an erasing current source 17 to the erase head 2 through the switch 16' in case of recording.

Figure 1:
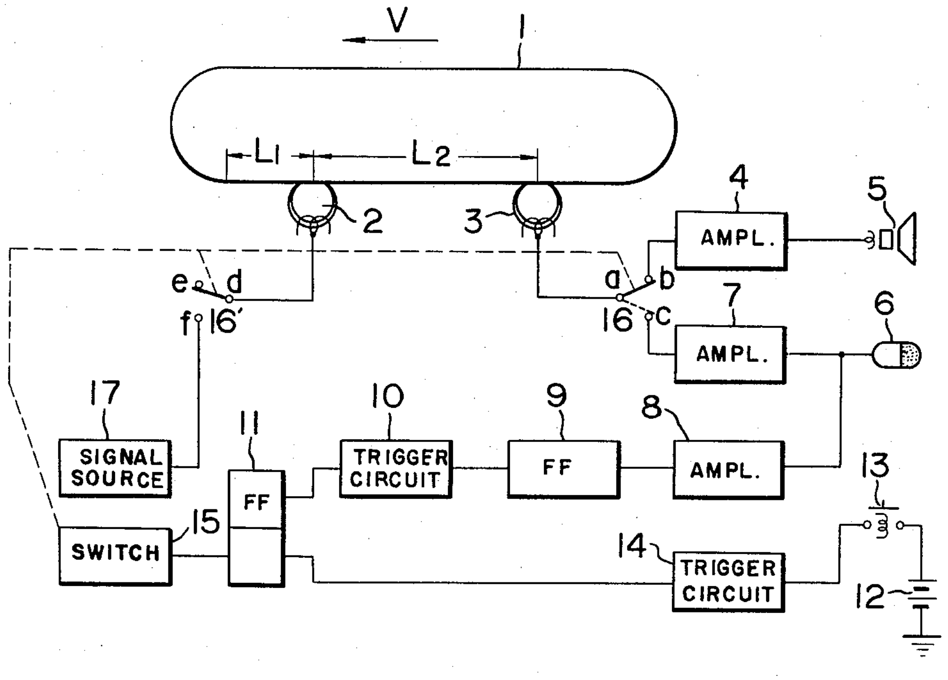
FIG. 1 is a block diagram for explanation of the principle of the present invention.

The electric circuit in FIG. 1 is shown as being in the playback mode, and the endless tape transportation mechanism is not shown.

Figure 2:
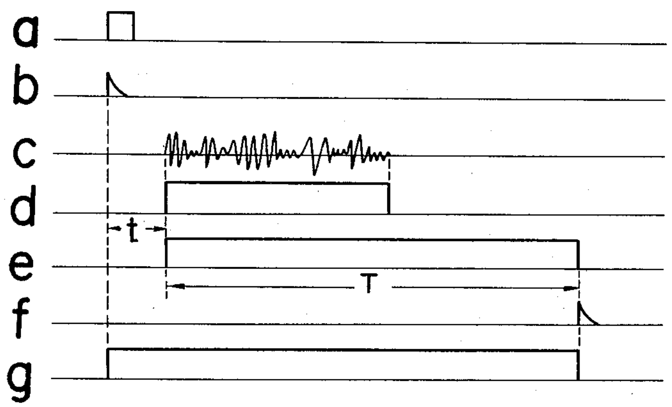
FIG. 2 is a graph for explanation of operation of the apparatus shown in FIG. 1.

Next the mode of operation will be described with reference to FIG. 2. Upon depression of the pushbutton 13 in case of recording the signal *a* in FIG. 2 is generated and is reshaped into the signal *b* by the trigger circuit 14 so as to set the bistable multivibrator 11. In consequence, the mode selector 15 is actuated so that the switches 16 and 16' are switched to the record mode from the playback mode. The mode of operation of the bistable multivibrator 11 is indicated by *g* in FIG. 2. In the record mode, the contacts *a* and *c* and *d* and *f* of the respective switches 16 and 16' are closed so that the erasing current is supplied to the erase head 2 from the source 17 while the record-reproduce head 3 is electrically connected to the record amplifier 7.

The audio signals from the microphone 6 are amplified into the signals *c* in FIG. 2 by the record amplifier 7 and then applied to the record-reproduce head 3 through the contacts *a* and *c* of the switch 16 so that the audio signals are recorded upon the endless tape 1. In this case, the signal *d* is generated by the trigger circuit 8 comprising a circuit for detecting the threshold value of the signal from the amplifier. The time interval elapsed from the time the pushbutton 13 is depressed to the time an operator starts to speak before the microphone 6 is designated by t. The monostable multivibrator 9 is triggered by the rising edge of the signal *d* generated by the trigger circuit 8 and generates the signal *e*, which continues during a time T. More specifically, the time T, that is the time interval the monostable multivibrator remains in the triggered state, is so selected as to satisfy the following condition:

$$T \leqq \left( To - \frac{L_1 + L_2}{V} \right)$$

where $To$ = time required for the endless tape to make one rotation.

The trigger circuit 10 generates a signal *f* at the trailing edge of the signal *e* generated by the monostable multivibrator so that the bistable multivibrator 11 is reset after the time of $(t + T)$ from the setting thereof. Thus, the record-playback mode selector 15 is returned to the playback mode after a time *g* in FIG. 2. Since the monostable multivibrator 9 is locked in the triggered state during the time interval T as described above, the leading edge of the signals recorded upon the endless tape 1 is spaced apart from the erase head 2 a distance longer than $L_1$, that is the distance upon which the effect of the erase head 2 does not act. Even when the amount of audio signals recorded upon the endless tape 1 through the microphone 6 is not sufficient to be recorded over the whole length of the tape 1, the contact *f* of the switch 16' is closed so that the erase head 2 erases the portion of the endless tape upon which no audio signal is recorded. Thus, the previously recorded signals as well as noise are all erased. That is, only the signals generated from the microphone 6 are recorded upon the endless tape 1.

Figure 3:
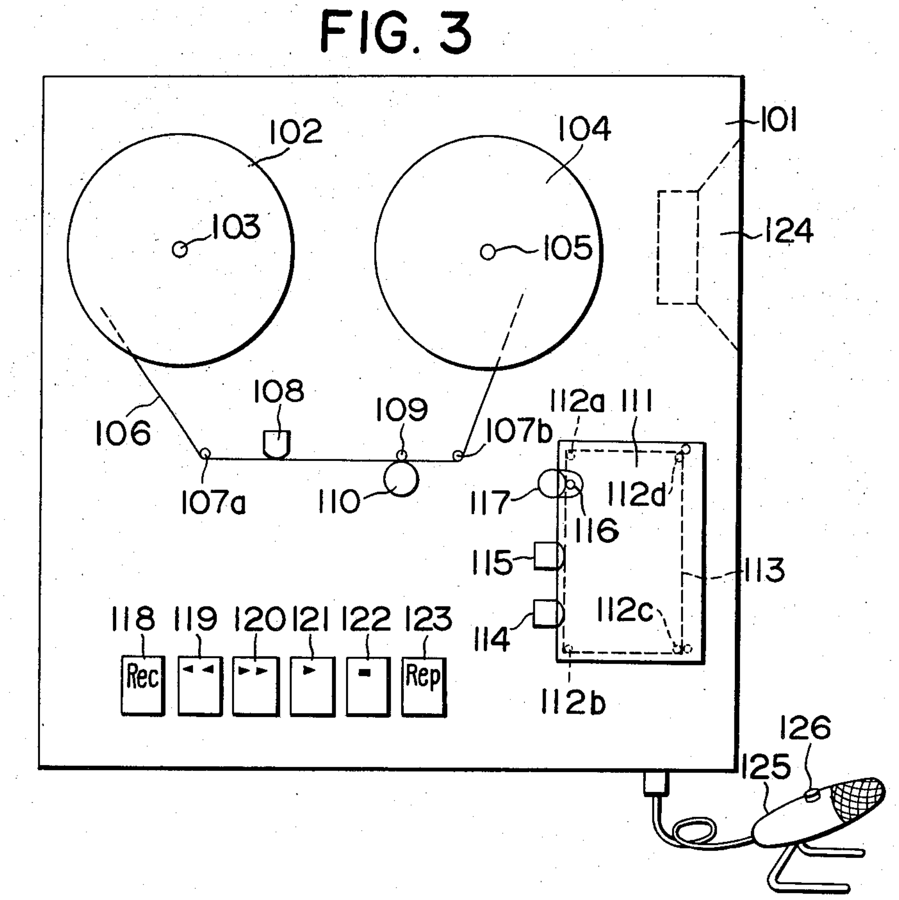
FIG. 3 is a schematic diagram illustrating a magnetic tape recorder which is designed for self-learning and embodies the present invention.

FIGS. 3 – 10 illustrate a magnetic tape recorder embodying the present invention especially for use in learning a foreign language. Referring to FIG. 3, a magnetic tape recorder casing generally designated by 101 has a magnetic tape supply reel 102 and a takeup reel 104 rotating about shafts 103 and 105 respectively. A magnetic tape 106 upon which are recorded the teaching materials is transported from the supply reel 102 to the takeup reel 104 through fixed guide pins **107*a* and 107*b* in contact with a magnetic head 108 by a capstan 109** driven by a motor (not shown) and a pinch roller at a predetermined speed.

Figure 6:
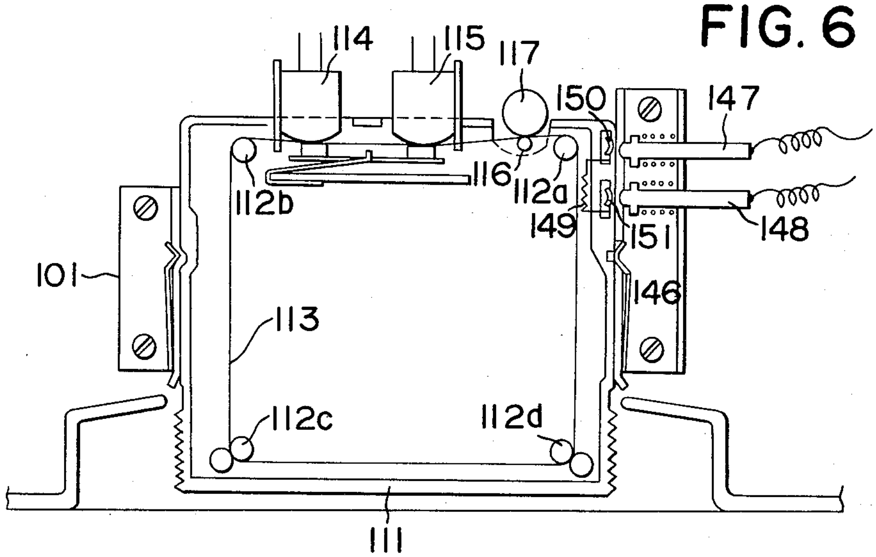
FIG. 6 is a schematic diagram in cross section of a cartridge employed in the tape recorder shown in FIG. 3.
Figure 8:
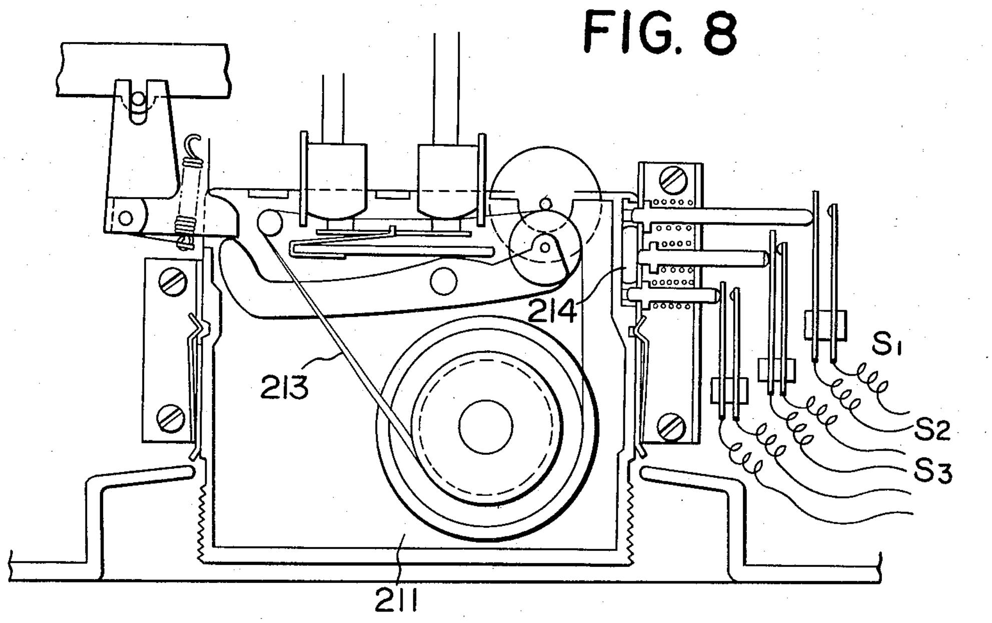
FIG. 8 is a schematic diagram in cross section of a cartridge used when the circuit shown in FIG. 7 is utilized.

A cartridge 111 which is loaded in the right side portion of the tape recorder casing 101 and retained in position by the means to be described in more detail with reference to FIG. 6 has an endless tape 113 guided by guides **112*a*, 112*b*, 112*c* and 112*d*. The endless tape 113 may be made in contact with an erase head 114 and a record-reproduce head 115 on the side of the tape recorder casing 101 through an opening made through the front side wall of the cartridge 111** when the latter is loaded.

Figure 9:
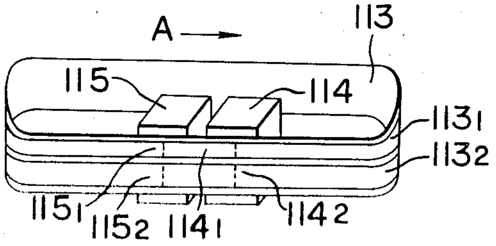
FIG. 9 is a detailed view illustrating the position of an endless tape relative to recording heads of the tape recorder shown in FIG. 3.

The relation of the endless tape 113 with respect to the heads 114 and 115 is more specifically illustrated in FIG. 9. The two-channel erase heads $114_1$ and $114_2$ and the two-channel record-reproduce heads $115_1$ and $115_2$ are made in contact with the first and second tracks $113_1$ and $113_2$ of the endless tape 113 respectively. The endless tape 113 is transported by a capstan 116 and a pinch roller 117 on the side of the tape recorder casing 101.

Referring back to FIG. 3, the modes of recording and playback of the tapes 106 and 113 are selected by a series of buttons 118–123 disposed upon the panel of the tape recorder casing 101. By depressing a record button 118, the tape 106 is recorded. By depression of a rewind button 119, the tape 106 is rewound, and the tape 106 is fast-forwarded by a fast-forward button 120. By depression of a reprint or transfer button 121, the teaching materials recorded upon the tape 106 is reproduced and then reprinted upon the endless tape 113. Reference numeral 112 designates a stop button; and 123, a repeat button for repeating the playback of the endless tape 113. The tape recorder casing 101 has a built-in loudspeaker 124 and an operator may record his speech through a microphone 125 by depressing a push button 126.

Figure 4:
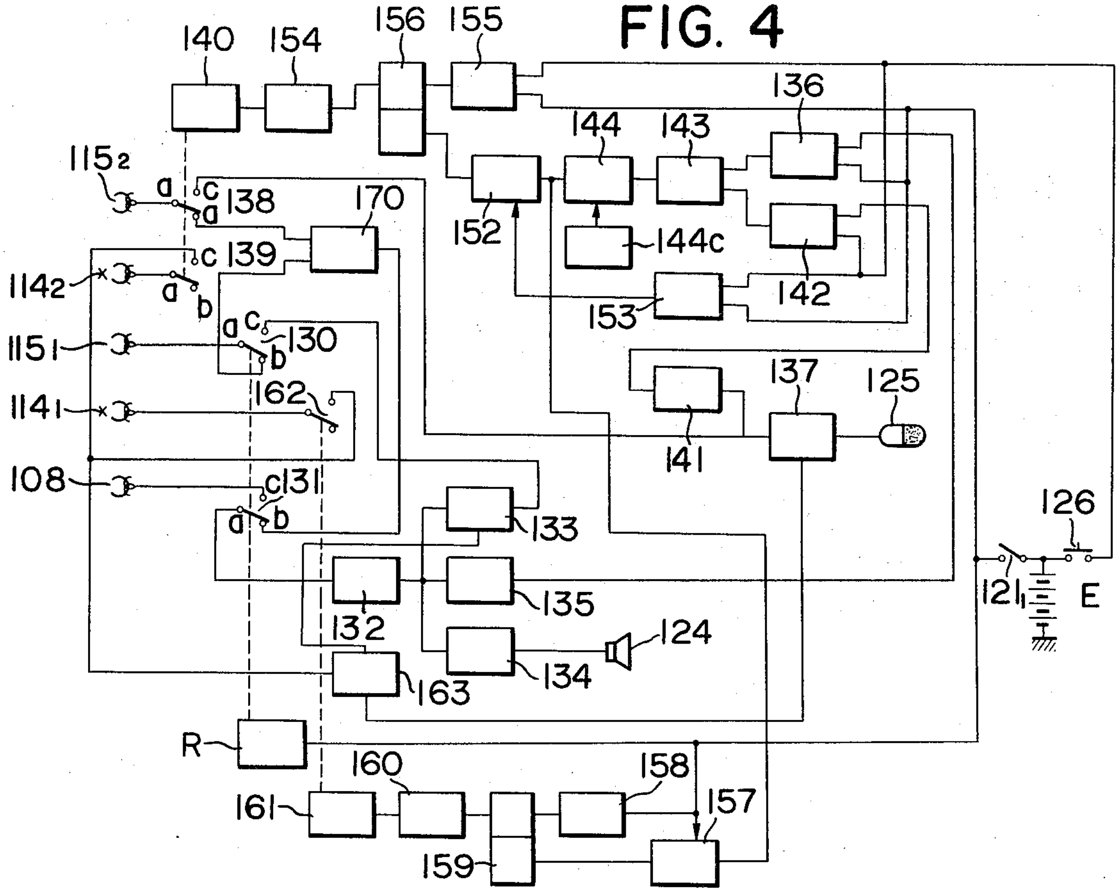
FIG. 4 is a diagram of an electric circuit of the apparatus shown in FIG. 3.

Next referring to FIG. 4, the electric circuit of the tape recorder will be described. The head 108 for the tape 106 and the record-reproduce head $115_1$ for the first track of the endless tape 113 are connected to switch 131 and 130 respectively. A movable contact arm *a* of the switch 131 is normally connected to a contact *b* when a solenoid R is not energized, and is connected to a playback preamplifier 132 and to a fixed contact *c* in the switch 130 through an auxiliary recording circuit 133 and to a loudspeaker 124 through a power amplifier 134.

The solenoid R which actuates the switches 130 and 131 is connected in series with a DC source E through a switch $121_1$ which is closed in response to the depression of the playback button 121.

The output of the preamplifier 132 is applied to a pulse reshaping and amplifying circuit 135 which is adapted to convert the audio input signals into the pulses. It may be a suitable conventional pulse circuit such as a Schmitt circuit.

The output of the amplifier 135 is applied to a gate of a logic circuit 136, another input of which is connected to the DC source E through the switch $121_1$. Therefore, the output of the logic circuit 136 may be derived only when the switch $121_1$ is closed by the playback button 121 for reproducing the tape 106 through the head 108 and the output is derived from the head 108.

The audio signals from the microphone 125 is applied through a record amplifier 137 to a contact *c* of the switch 138. A movable contact arm of the switch 138 is connected to the record-reproduce head $115_2$ (See FIG. 9 ) for the second track of the endless tape 113. A movable contact arm of the switch 139 is connected to the erase head $114_2$ for the second track of the endless tape 113 and is normally connected to the contact *b* when a solenoid 140 is not energized. The switches 138 and 139 are actuated by the solenoid 140.

The record amplifier 137 is connected to a pulse reshaping and amplifying circuit 141 so that the audio signals from the microphone 125 may be converted into the pulse signals and then applied to a gate of logic circuit 142, another input of which is connected to the DC source E through a mode selection button 126 in the microphone 125. Therefore, the output may be derived from the logic circuit 142 only when the operator depresses the mode selection button 126 and speaks before the microphone 125.

The output terminals of the logic circuits 136 and 142 are connected to an AND circuit 143 which in turn is connected to a monostable multivibrator 144.

Figure 5:
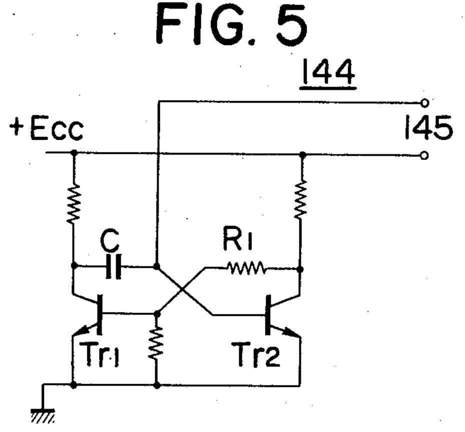
FIG. 5 is a diagram of practical time setting circuit included in the apparatus in FIG. 4.

A block 144c connected to the monostable multivibrator 144 for setting a time required for the endless tape 113 to make one rotation will be described with reference to FIGS. 5 – 8. Referring to FIG. 5, the collector of a transistor $TR_1$ of the monostable multivibrator 144 is interconnected to the base of the transistor $TR_2$ through a capacitor C while the base of a transistor $TR_1$ is interconnected to the collector of the transistor $TR_2$ through a resistor $R_1$. The terminals 145 are connected to a pair of detecting electrodes 147 and 148 disposed upon guide plate 146 for the cartridge 111 as shown in FIG. 6.

The cartridge 111 incorporates therein a resistor 149 whose value is determined depending upon a time required for the endless tape 113 to make one rotation and which is connected to electrodes 150 and 151 of elastic material which are exposed beyond the side wall of the cartridge 111. The pair of electrodes 150 and 151 are so disposed as to make contact with the pair of electrodes 147 and 148 on the side of the tape recorder casing 101 when the cartridge 111 is loaded therein.

Thus, when the cartridge 111 is loaded in the tape recorder casing 101, the resistor 149 in the cartridge 111 is connected in parallel with the capacitor C in the monostable multivibrator in FIG. 5 so that the resistor 149 and the capacitor c constitute a time constant circuit for the monostable multivibrator. When the output of the logic circuit 143 is applied to the base of the transistor $Tr_1$, the latter is rendered into conduction while the transistor $Tr_2$ is into non-conduction. However, the transistor $Tr_1$ is rendered into non-conduction after a time interval determined by the RC circuit while the transistor $Tr_2$ is into conduction. When the value of the resistor 149 is so selected that the duration of the conduction of the transistor $Tr_2$ may be equal to a time required for the endless tape to make one rotation, the monostable multivibrator 144 remains triggered during the time the endless tape 113 makes one rotation.

Figure 7:
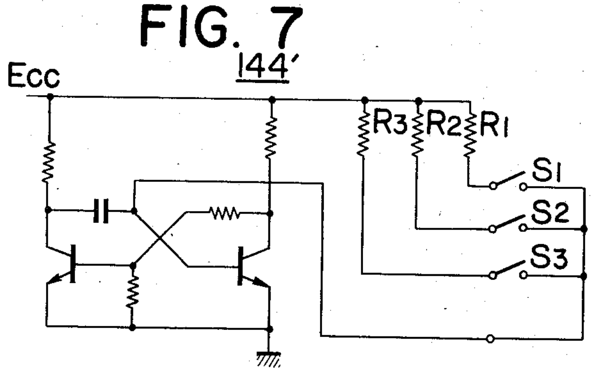
FIG. 7 is a variation of the circuit shown in FIG. 5.

FIG. 7 illustrates a variation of the monostable multivibrator 144. A cartridge 211 has recess 214 the combination of which represents the length of the endless tape 213 incorporated in the cartridge 211. Therefore, one of the selection switches $S_1$, $S_2$ and $S_3$ on the side of the tape recorder casing is closed depending upon the length of the endless tape 213 so that one of the resistors $R_1$, $R_2$ and $R_3$ of the RC circuit of the monostable multivibrator 144' may be selected.

The output of the monostable multivibrator 144 is applied to an inhibit circuit 152 which is controlled by a logic circuit 153 whose gate output is derived by depression of the mode selection switch 126. When the output is derived from the logic circuit 153, no output is derived from the monostable multivibrator 144.

The solenoid 140 for actuating the switches 138 and 139 is connected to a drive amplifier 154 which in turn is connected to a drive amplifier flip-flop 156 which is set by a logic circuit 155 having the same output as the logic circuit 153 which resets the inhibit circuit 152. The output of the monostable multivibrator 144 is applied to an inhibit circuit 157 which is controlled by the playback button $121_1$. That is upon depression of the button 121the DC source E is connected so that no output is derived from the multivibrator 144. When the DC circuit E is connected upon depression of the playback button $121_1$, a trigger circuit 158 applies to a trigger pulse to a set terminal of a flip-flop circuit 159 whose reset terminal is connected to the inhibit circuit 157.

A relay 161 is energized by the output of the an amplifier 160 through the flip-flop 159, a relay amplifier 150. The contact 162 of the relay 161 is connected to the erase head $114_1$ for the first track $113_1$ of the endless tape 113 and the movable contact arm is switched from the lower contact to the upper contact when the relay 161 is energized.

The output of a high-frequency-current generating circuit 163 is applied to the erase heads $114_1$ and $114_2$ through the contacts 162 and 139 and to the record heads 130 and 138 through the amplifiers 133 and 137 as bias current.

Next the mode of operation of the tape recorder having the arrangement described hereinbefore will be described hereinafter. When the cartridge 111 shown in FIG. 6 is loaded as shown in FIG. 3, the pair of electrodes 150 and 151 fixed to the side wall of the cartridge 111 are made in contact with the detecting electrodes 147 and 148 on the side of the tape recorder casing 101. Therefore, the resistor 149 in the cartridge 111 is connected in parallel with the capacitor C in the monostable multivibrator 144 (See FIG. 5) so that the time interval that the monostable multivibrator 144 is triggered is determined by the RC circuit consisting of the capacitor C and the resistor 149.

When the playback button 121 is depressed, both of the tape 106 and the endless tape 113 are transported so that the teaching materials on the tape 106 having a predetermined length may be reproduced through the head 108.

The switch $121_1$ is closed in response to the depression of the playback button 121 ( See FIG. 4 ) so that the solenoid R is energized by the current from the DC source E so that the movable contact arms in the switches 130 and 131 are switched from the contacts *b* to the contacts *c*. In consequence, the signals from the reproduce head 108 drives the loudspeaker 124 through the preamplifier 132 and the power amplifier 134, and simultaneously applied to the head $115_1$ in contact with the first track $113_1$ of the endless tape 113 through the auxiliary recording amplifier 133. Thus, the teaching materials upon the main tape 106 may be recorded or reprinted upon the first track $113_1$ of the endless tape 113.

When the teaching materials are reproduced through the head 108 after depression of the playback button 121, the leading end portion of the teaching materials is converted into the pulse waveform by the circuit 135 and applied to the gate of the logic circuit 136. Another gate of the logic circuit 136 is applied with the input upon closing the switch $121_1$ so that the output is derived from the logic circuit 136 when the signals on the main tape 106 are reproduced through the head 108. Consequently, the monostable multivibrator 144 is triggered through the AND circuit 143 so that the input signal is applied to the inhibit circuit 152. However, the inhibit signal is applied to the terminal of the inhibit circuit 152 through the logic circuit 153 upon closing the switch $121_1$, so that the application of the output from the monostable multivibrator 144 to the reset terminal of the flip-flop 156 is inhibited. The flip-flop 156 is set when the switch $121_1$ is closed so that the solenoid 140 is energized to close the contacts *c* of the switches 138 and 139. When the switch $121_1$ actuable in response to the depression of the playback button is closed, the flip-flop 159 is triggered so that the relay 161 is energized. Consequently, the upper terminal in the contact 162 is closed. Since the solenoid R is also energized, the terminals *c* in the switches 130 and 131 are closed.

The reset terminal of the flip-flop 159 is connected to the output terminal of the monostable multi-vibrator 144 through the inhibit circuit 157 so that no inhibit output is applied to the flip-flop 159 through the switch $121_1$ or 126. In consequence, the flip-flop 159 will not be reset until the monostable multivibrator is switched to the stable state. Thus, the relay 161 remains energized. Therefore, the erase current is applied to the erase head $141_1$ during the time endless tape 113 makes one rotation upon depression of the playback button 121 that the signals upon the endless tape 113 may be erased completely.

As described above, upon depression of the playback button 121, the relays R, 140 and 161 are energized so that the movable contact arms are switched from the terminal *b* to *c*. Therefore, the erase currents are applied to the erase heads $114_1$ and $114_2$ for the first and second tracks of the endless tape 113.

Figure 10:
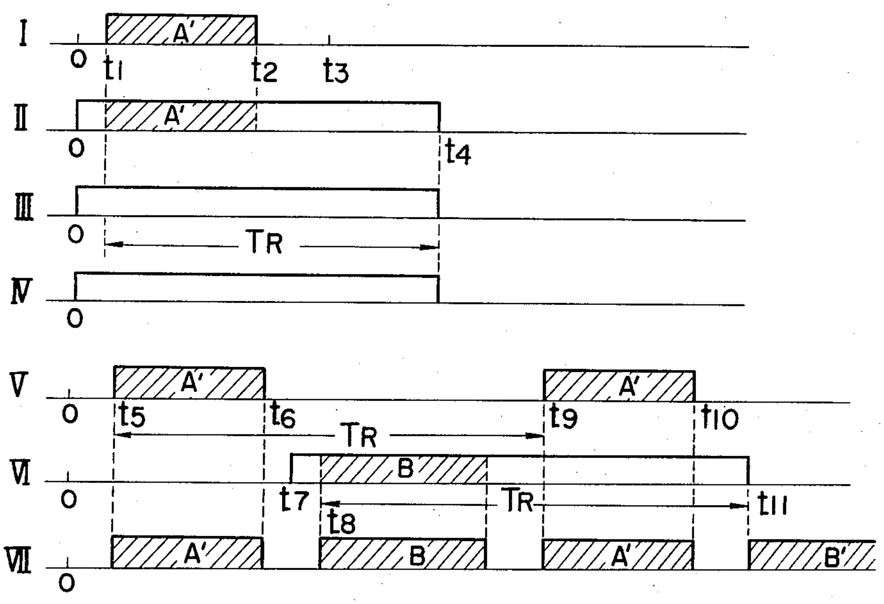
FIG. 10 is a graph for explanation of the mode of operation of the circuit shown in FIG. 4.

FIG. 10 illustrates graphically the mode of reprinting upon the endless tape 113 the teaching materials recorded on the main tape 106 while the latter is reproduced. In other words, the mode of recording and reproducing the endless tape by depression of the playback button 121 is illustrated. The switch $121_1$ is closed at time 0 by depressing the playback button so that the relay 161 is energized to actuate the contact 162. Consequently, the erase current is applied to the erase head $114_1$ for the first track $113_1$ (See FIG. 10–III).

From time $t_1$ to $t_2$ is energized the relay R so that the teaching materials A′ on the main tape 106 reproduced through the head 108 are reprinted upon the first track $113_1$ of the endless tape 113 because the contact 131 is switched. (FIG. 10–I and II).

Upon depression of the playback button, the switch $121_1$ is closed so that the relay 140 is energized thereby to switch the contact 139. In consequence, the erase current is also applied to the erase head $114_2$ for the second track $113_2$ of the endless tape 113 ( FIG. 10–IV ). This condition continues after $t_3$ when the operator releases the playback button in order to stop the main tape 106 as he heard a series of teaching materials A′. The erase current is stopped at $t_4$ the time interval $T_R$ required for the endless tape to make one rotation after time $t_1$ when the leading end of the teaching materials is reproduced. Therefore, it is seen that the erase currents are applied to both of the erase heads $114_1$ and $114_2$ for the endless tape 113 during the time interval $T_R$ when the tape 106 is transported so that the teaching materials on it may be reprinted upon the endless tape 113. Thus, the endless tape 113 is completely erased and then the teaching materials A′ are recorded on the first track.

When the repeat button 123 is depressed after time $t_3$, only the endless tape 113 is transported. In this case, the playback button 121 is released so that the switch $121_1$ is opened. Therefore, the relay R is deenergized so that the movable contact arms of the switches 130 and 131 are switched to the contact *b*. Consequently, the teaching materials B′ reprinted upon the first track $113_1$ of the endless tape 113 is repetitively reproduced through the head $115_1$ and the loudspeaker 124.

The student may imitates the teaching materials A′ as they are reproduced, by depressing the microphone switch 126. As shown in FIG. 10–VI, the head $115_2$ for the second track $113_2$ of the endless tape 113 is switched to the record mode because upon depression of the switch 126, the relay 140 is energized so as to switch the movable contact arm to the contact *c* in the switch 138. The time when the switch 126 is closed in indicated by $t_7$. At the time when the student's imitated speech or voice enters into the microphone 125, the output of the logic circuit 142 is applied to the monostable multivibrator 144 through logic circuit 143 so that the multivibrator 144 is triggered. Since the duration of the monostable multivibrator 144 being locked in the triggered state is predetermined by the time setting resistor 149 of the cartridge 111, the monostable multivibrator 144 may be returned to its stable state when the endless tape 113 in the cartridge makes one rotation.

After imitation, the student releases the switch 126 incorporated in the microphone so that no inhibit signal is derived from the inhibit circuit 152. Subsequently the flip-flop 156 is reset when the monostable multivibrator 144 is switched to its stable state so that the relay 140 is de-energized. Therefore, the head $115_2$ for the second track of the endless tape is switched to the playback mode when the endless tape 113 makes one rotation after time $t_7$ so that the imitation B recorded may be reproduced through the mixer 170, the preamplifier 132 and the power amplifier 134 from the speaker 124 together with the reprinted teaching materials A′ ( See FIG. 10–VII ).

When the student releases the microphone switch 126 before the endless tape completes its one rotation after time $t_7$, the inhibit circuit 152 generated the inhibit signal so that the relay 140 remains energized even when the monostable multivibrator 144 is switched to the stable state. The monostable multivibrator 144 is triggered when the student starts to imitate, that is the time when the audio signals of the student imitation enter the microphone 125, the head $115_1$ is always held in the record mode during the time the second track of the endless tape makes one rotation from the start of the imitation. During this time, the erase current continues to flow into the erase head $114_2$.

From the foregoing, it is seen that the imitation by the student may be recorded upon the endless tape only after it is erased so that it becomes possible to prevent the double-recording. In addition, the undesired signals may be erased so that only desired signals may be recorded. The signals to be recorded upon the endless tape are employed to intermittently supply the erase current to the erase head through the timing circuit consisting of the monostable multivibrator, the inhibit circuit and flip-flops when the signals are started to be recorded or simultaneously when the recording is accomplished so that the undesired signals upon the endless tape may be completely erased. Thus, it is possible to record the desired signals only upon the desired portion on the tape. It is seen that the invention is very advantageous when applied to a magnetic tape recorder for learning a foreign language.

In the embodiment illustrated and described hereinabove, the resistor having a value depending upon or representing the length of the endless tape is incorporated in the cartridge in order that the tape recorder may automatically detect the length of the endless tape. However, such arrangement is not necessarily required. For example, a signal representative of the length of an endless tape may be recorded thereon, the frequency of the signal being varied depending upon the length of the tape. The signal may be detected for varying the time set by the timing circuit.

As described above according to the present invention only the desired information may be recorded upon a recording medium such as endless magnetic tape through a microphone or from another magnetic tape and undesired noise may be erased. Therefore, the present invention is advantageous when applied to tape recorders for learning or dictation.

In the embodiment illustrated and described hereinabove, the endless magnetic medium is shown and described as an endless tape, but the present invention may be also applied in case of a magnetic disk, drum, etc. In addition to the information through the microphone or from the magnetic tape, the information transmitted by the communication lines may be also recorded.

What is claimed is:

1. A magnetic recording and reproducing apparatus including a cartridge having an endless magnetic recording medium therein, said apparatus comprising a casing; means mounted on said casing for releasably holding said cartridge; recording means for recording signals upon said endless magnetic recording medium during a recording mode when said cartridge is held on said casing; detecting circuit means for detecting a starting time of said recording signals, and for providing an output signal at said starting time; means for switching said recording means into an operative state to record said recording signals on said recording medium in response to said output signal; timing means connected to said detecting circuit and being set by the output from said detecting circuit and reset after said endless magnetic recording medium moves a predetermined length which is less than one complete rotation; and means connected to said timing means for switching said recording means into an inoperative state at the reset time of said timing means; time setting circuit means disposed in said cartridge and including means providing an analog representation of a desired period between the said setting the resetting times, and connector means having a first portion mounted on said cartridge and connected to said time setting circuit means, and having a second portion connected to said timing means and being mounted on said casing for engaging said first connector means portion to interconnect said time setting circuit means to said timing means when said cartridge is held on said casing, wherein said time setting circuit means is for controlling the period between said set and reset times of said timing means; whereby said time setting circuit means controls the extent of said predetermined length of movement of said recording medium, so that said signals are recorded along the predetermined length of said endless magnetic recording medium and after recording, the recording mode is automatically switched to the mode in which no signal is recorded upon said endless magnetic recording medium.

2. The magnetic recording and reproducing apparatus according to claim 1 wherein said recording means includes a magnetic recording head disposed to face said endless magnetic recording medium and connected to said switching means whereby, at said reset time, said switching means interrupts the application of said signals to be recorded to said magnetic head.

3. The magnetic recording and reproducing apparatus according to claim 1 wherein said recording means has an erase head and a record head both disposed to face a recording track of said endless magnetic recording medium along the direction of recording; and further comprising an erase current generating source connected to said erase head for supplying an erase current; and a source for supplying said recording signals connected to said record head.

4. The magnetic recording and reproducing apparatus according to claim 1 wherein said timing means has a time constant circuit including said time setting means, and having a time constant equal to a time required for said endless magnetic recording medium to move said predetermined length which is less than one rotation.

5. The magnetic recording and reproducing apparatus according to claim 1 wherein said recording means includes an erase head and a record head disposed in opposed relation with said endless magnetic recording tape along its recording direction, means for connecting said erase head to an erase current source through an erase current feed line; said timing means includes a flip-flop which is actuated by the output from said time setting circuit and is connected thereto, said flip-flop is connected to actuate said switching means.

6. The magnetic recording and reproducing apparatus according to claim 1 wherein said timing means includes a flip-flop circuit having an output terminal connected to said switching means, whereby said flip-flop is actuated by said signals to be recorded so as to actuate said switching means to switch said recording means into said operative state during the period between said set and reset times.

7. The magnetic recording and reproducing apparatus according to claim 6 wherein said flip-flop circuit comprises a monostable multivibrator, and wherein said time setting circuit means comprises a resistor mounted in said cartridge and coupled by said connector means to form a portion of said multivibrator.

8. A magnetic recording and reproducing apparatus including a cartridge having an endless magnetic medium therein characterized by the provision of: recording means for recording information upon said endless magnetic recording medium in the cartridge; time setting means arranged on said cartridge for proving an analog quantity corresponding to the time required for one cycle of said endless medium; detecting means for detecting the said analog quantity; timing means connected to said detecting means for providing an output signal having a time period controlled by the said analog quantity detected by said detecting means, said timing means having an adjustable time setting circuit connected for adjustment by said detecting means and reset after said endless magnetic recording medium makes one rotation, and means operatively connected to said timing means for switching said recording means into an inoperative state after one rotation of said medium, whereby said information is recorded along the whole length of said endless magnetic recording medium and, after recording, the recording mode is automatically switched to the mode in which no signal is recorded upon said endless magnetic recording medium.

9. The magnetic recording and reproducing apparatus according to claim 8 wherein said time setting member comprises recesses and ridges formed on the side wall of said cartridge so as to represent a time required for said recording medium housed in said cartridge to make one rotation; and said detecting member detects said recesses and ridges to set a time for said time setting circuit by a mechanical displacement.

10. The magnetic recording and reproducing apparatus according to claim 8 wherein said recording means includes switching means for switching said recording means to a recording mode in response to a switching signal, said switching means includes a switching signal generating circuit for generating the switching signal in response to actuation of said switching means; and said timing means includes a flip-flop having an output terminal and a reset terminal, an inhibit circuit connected between said reset terminal and said time setting circuit, wherein said output terminal is connected to said first mentioned switching means, said inhibit circuit is actuated at least by either of the output from said switching signal generating circuit or the output from said detecting circuit, thereby interrupting the application of a reset signal to said time setting circuit, preventing switching of said flip-flop, and retaining said recording means in said recording mode through said first mentioned switching means.

11. The magnetic recording and reproducing apparatus according to claim 10 wherein said timing means includes a logic AND circuit having gate terminals connected to said switching signal generating circuit and said detecting circuit and whose output terminal is connected to said inhibit circuit.

12. The magnetic recording and reproducing circuit as defined in claim 10 wherein said recording means includes an erase head and a record head disposed in an opposed relation with said recording track of said endless magnetic recording medium along its recording direction; said erase head includes means for electrical connection to an erase current generating source through a feed line for supplying the erase current; said recording head has a feed line for applying said signals to be recorded; and said first mentioned switching means is adapted to disconnect said erase current generating source from said erase head.

13. The magnetic recording and reproducing apparatus according to claim 10 wherein said timing means includes an inhibit circuit means interconnected between said time setting circuit and said flip-flop to control the conduction and non-conduction of the output from said time setting circuit; said inhibit circuit means having a connection to said signal generating circuit for inhibiting the transmission of its input in response to the output of said switching signal generating circuit; whereby during the time said recording means is actuated said flip-flop maintains said switching means in a deactuated state.

* * * * *